United States Patent
Kawai et al.

(10) Patent No.: US 9,148,919 B2
(45) Date of Patent: Sep. 29, 2015

(54) METHOD FOR MITIGATING FLICKER

(71) Applicant: Semiconductor Components Industries, LLC, Phoenix, AZ (US)

(72) Inventors: Shuhei Kawai, Gunma-ken (JP); Kojima Hiroyuki, Saitama-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 49 days.

(21) Appl. No.: 14/098,529

(22) Filed: Dec. 6, 2013

(65) Prior Publication Data

US 2015/0163873 A1 Jun. 11, 2015

(51) Int. Cl.
*H05B 33/08* (2006.01)

(52) U.S. Cl.
CPC ........ *H05B 33/0815* (2013.01); *H05B 33/0845* (2013.01)

(58) Field of Classification Search
None
See application file for complete search history.

(56) References Cited

U.S. PATENT DOCUMENTS

| 8,525,438 B1 | 9/2013 | Cheung et al. |
| 8,698,407 B1 * | 4/2014 | Chen et al. ............... 315/193 |
| 2008/0258647 A1 | 10/2008 | Scianna |
| 2011/0068706 A1 | 3/2011 | Otake et al. |
| 2011/0074292 A1 * | 3/2011 | Maehara ................. 315/32 |
| 2012/0249000 A1 * | 10/2012 | Kawai et al. ............ 315/200 R |
| 2012/0286663 A1 | 11/2012 | Puvanakijjakorn et al. |

FOREIGN PATENT DOCUMENTS

WO 2013114260 A1 8/2013

* cited by examiner

*Primary Examiner* — Douglas W Owens
*Assistant Examiner* — Dedei K Hammond
(74) *Attorney, Agent, or Firm* — Rennie William Dover

(57) ABSTRACT

In accordance with an embodiment, a control circuit for controlling a light emitting diode includes a first switching circuit having first and second inputs and an output and a second switching circuit having at least first and second inputs and an output, the first input coupled to the second input of the first switching circuit. Another embodiment includes a method for reducing flicker by generating an adjusted rectified voltage in response to a TRIAC dimmer signal from a TRIAC dimmer and a switching current in response to the adjusted rectified voltage being greater than a first reference voltage. The switching current is decreased in response to the adjusted rectified voltage becoming less than the first reference voltage. The TRIAC dimmer is turned off in response to decreasing the switching current.

13 Claims, 8 Drawing Sheets

METHOD FOR MITIGATING FLICKER

BACKGROUND

The present invention relates, in general, to electronics and, more particularly, to control circuits and methods.

In the past, TRIAC dimmers have been used to change voltage levels to loads coupled to Alternating Current (AC) power sources. In the lighting field, the TRIAC dimmers allow dimming the light intensity to a desired level. Dimming light sources results in flicker as the intensity of the light signal decreases, i.e., as it becomes dimmer. For incandescent light bulbs the issue with flicker may be solved by connecting a resistive load at the output of the dimmer. This technique is unsuitable for Light Emitting Diode (LED) light sources because the TRIAC dimmer will turn off in response to the switching current falling below the holding current of the TRIAC dimmer. U.S. Pat. No. 7,872,427 B2 issued to Carlo Scianna on Jan. 18, 2011, describes a technique for mitigating flicker in an LED by including a dummy load that turns on before the switching current falls below the holding current of the TRIAC dimmer, thereby inhibiting the TRIAC dimmer from turning off. A drawback with this approach is that the holding current varies from dimmer to dimmer. Thus, the duty cycle of the TRIAC dimmer becomes unstable and generates variability in the switching current during the AC cycle which leads to flicker in the LED. U.S. Pat. No. 8,492,992 B2 issued to Hirokazu Otake et al. on Jul. 23, 2013, describes another technique for mitigating flicker in an LED by delaying when the dummy load turns on. A drawback with this approach is that ripple is created in the LED current.

Accordingly, it would be advantageous to have a circuit and a method for mitigating the effects of a switching current falling below the holding current of a TRIAC dimmer. It is desirable for the circuit and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
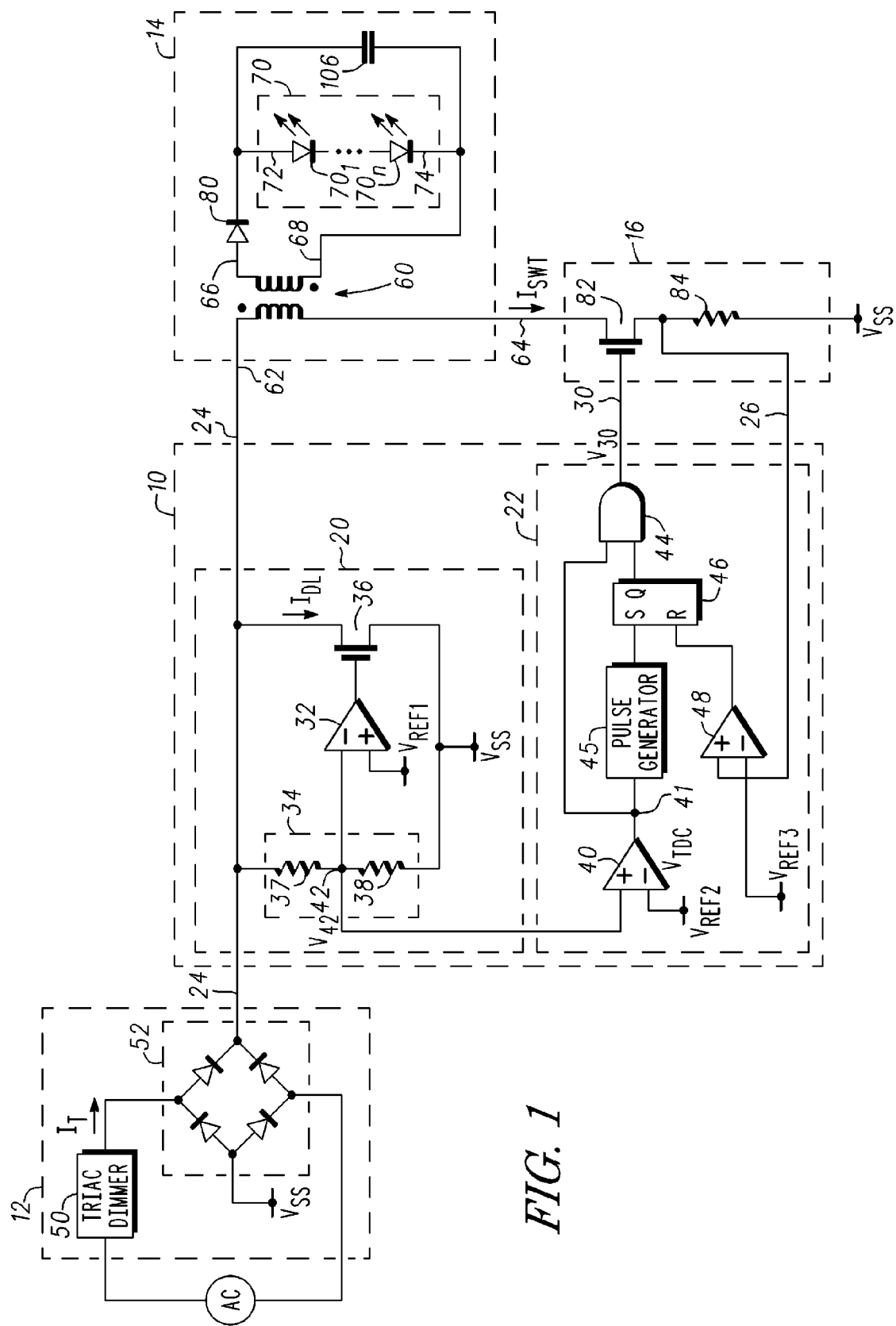
FIG. 1 is a circuit schematic of a control circuit suitable for controlling one or more light emitting diodes (LEDs) in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten per cent (10%) (and up to twenty per cent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

FIG. 1 is a circuit schematic of a control circuit 10 suitable for controlling one or more light emitting diodes (LEDs) in accordance with an embodiment of the present invention. What is shown in FIG. 1 is a control circuit 10 coupled to an input circuit 12, a light generator 14, and a driver circuit 16.

Control circuit 10 is comprised of switching circuits 20 and 22 and has an input/output node 24, an input 26, and an output 30. Switching circuit 20 includes a comparator 32 having an inverting input connected to a voltage divider network 34, a noninverting input coupled for receiving a reference voltage $V_{REF1}$, and an output connected to a transistor 36. Voltage divider network 34 includes resistors 37 and 38, wherein resistor 38 has a terminal coupled for receiving a source of operating potential such as, for example, $V_{SS}$, and a terminal connected to the inverting input of comparator 32. Resistor 37 has a terminal commonly connected to the inverting input of comparator 32 and to resistor 38 to form a node 42 and a terminal connected to or, alternatively, serving as input/output node 24. By way of example, transistor 36 is a field effect transistor having a gate connected to the output of comparator 32, a drain connected to input/output node 24, and a source coupled for receiving a source of operating potential $V_{SS}$, which may be, for example, a ground potential. It should be noted that in accordance with another embodiment the drain of transistor 36 may be connected to a terminal of resistor 37 to form input/output node 24.

Switching circuit 22 includes a comparator 40, a pulse generator 45, a logic gate 44, a latch 46, and a comparator 48. Comparator 40 has a non-inverting input connected to node 42, an inverting input coupled for receiving a reference voltage $V_{REF2}$, and an output commonly connected to an input of pulse generator 45 and to an input of logic gate 44, which logic gate may be, for example, a two-input AND gate. Thus, an input of switching circuit 22 is connected to an input of switching circuit 20. The output of logic gate 44 is connected to, or alternatively, serves as output 30. The output of pulse generator 45 is connected to, for example, a set input (S) of latch 46. The output of latch 46 is connected to another input of logic gate 44. Comparator 48 has a non-inverting input that serves as input 26 of control circuit 10, an inverting input coupled for receiving a reference voltage $V_{REF3}$, and an output connected to the reset input (R) of latch 46. By way of example, reference voltage $V_{REF3}$ is a bandgap reference voltage.

Input circuit 12 includes a dimmer 50 having an input coupled for receiving an alternating current (AC) signal and an output connected to an input of a rectifier 52, which rectifier 52 has an output connected to input/output node 24. By way of example, rectifier 52 is comprised of a plurality of diodes connected in a bridge configuration and dimmer 50 is a TRIAC dimmer.

Light generator 14 includes a transformer 60 having terminals 62, 64, 66, and 68 connected to a light source 70 having terminals 72 and 74. By way of example, light source 70 is comprised of one or more Light Emitting Diodes (LEDS) $70_1, \ldots, 70_n$, where "n" represents an integer. In accordance with embodiments in which light source 70 comprises a single LED $70_1$, terminal 72 may be an anode of LED $70_1$, and terminal 74 may be a cathode of LED $70_1$. In accordance with embodiments in which light source 70 comprises a plurality of LEDS, terminal 72 is an anode of LED $70_1$ and terminal 74 may be a cathode of LED $70_n$. FIG. 1 further illustrates a diode 80 having an anode connected to terminal 66, a cathode connected to the anode of LED $70_1$ and terminal 68 connected to terminal 74. A capacitor 106 has a terminal connected to terminal 72 of light source 70 and a terminal connected to terminal 74 of light source 70.

Switching circuit 16 comprises a field effect transistor 82 having a gate connected to the output of logic gate 44, a drain connected to terminal 64 of transformer 60 and a source coupled for receiving a source of operating potential $V_{SS}$ through a resistor 84. Operating potential $V_{SS}$ may be, for example, a ground potential. The source of transistor 82 and a terminal of resistor 84 are connected to input 26 of switching circuit 22. Transistor 82 is not limited to being an n-channel transistor or a field effect transistor.

Figure 2:
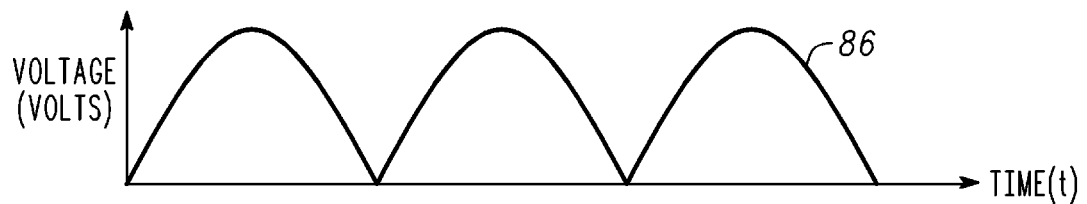
FIG. 2 is a plot of a fully rectified AC voltage signal versus time.

In operation, rectifier 52 outputs a fully rectified signal at input/output node 24 of control circuit 10. For the sake of completeness, FIG. 2 is a plot of a fully rectified AC voltage signal 86 versus time that would appear at input/output node 24 in the absence of dimming.

Figure 3:
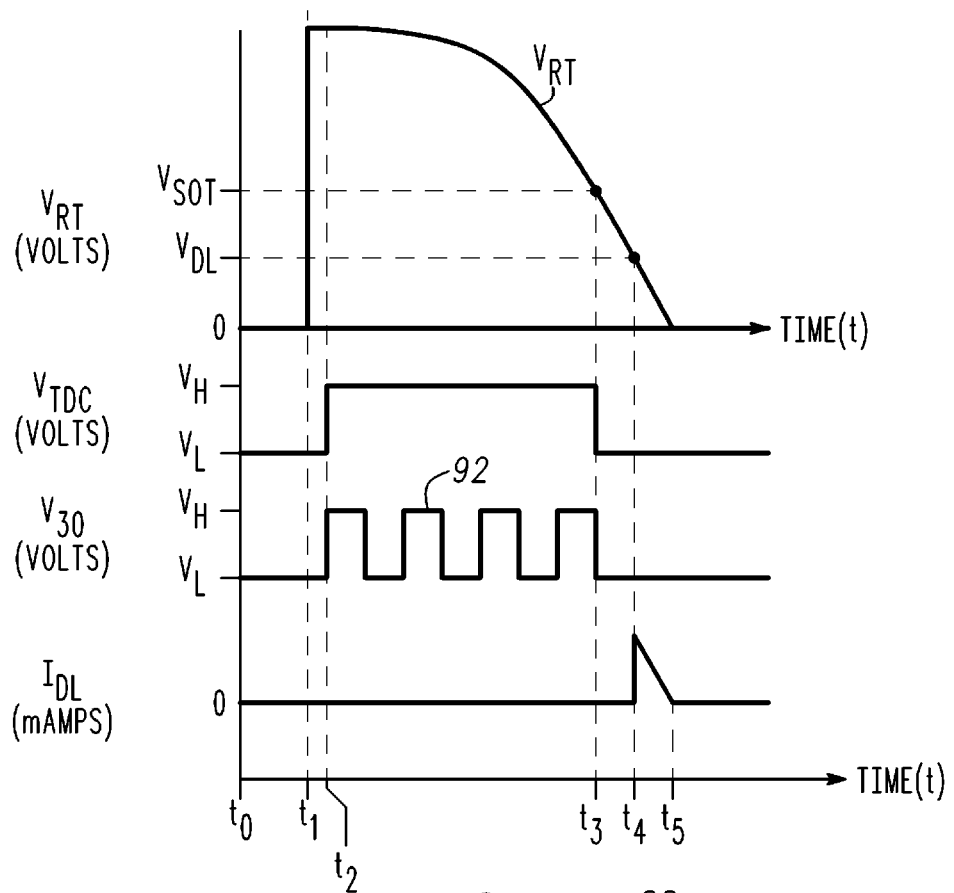
FIG. 3 is a timing diagram illustrating operation of the control circuit of FIG. 1 in accordance with embodiments of the present invention.

FIG. 3 is a timing diagram 88 illustrating the operation of control circuit 10 in accordance with embodiments of the present invention. Before time $t_0$, TRIAC dimmer 50 turns off or shuts off in response to a current $I_T$ flowing through its terminals being less than its holding current. In response to TRIAC dimmer 50 being off, the signal at the node 42, i.e., the voltage at the output of comparator 40 is at a logic low voltage level, the voltage at output 30, i.e., the voltage at the gate of transistor 82 is at a logic low voltage level, and the dummy load current is at substantially zero milliamps (mamps).

At time $t_1$, TRIAC dimmer 50 turns on in response to receiving a trigger signal and generates a rectified TRIAC signal $V_{RT}$ (shown in FIG. 3) at input/output node 24, which results in a voltage $V_{42}$ being developed at node 42, i.e., voltage $V_{42}$ is developed at node 42 in response to applying rectified voltage signal $V_{RT}$ at input/output node 24. Voltage $V_{42}$ may be referred to as an adjusted rectified voltage because its voltage level is adjusted by voltage divider 34. Voltage $V_{42}$ serves as an input signal at the inverting input of comparator 32 and at the non-inverting input of comparator 40. In response to voltage $V_{42}$ exceeding reference voltage $V_{REF2}$, comparator 40 generates a voltage signal $V_{TDC}$ (shown in FIG. 3) having a logic high voltage level at node 42. Voltage $V_{TDC}$ being at a logic high voltage level causes pulse generator 45 to generate a pulse train that is latched by latch 46. Because voltage $V_{TDC}$ may cause pulse generator 45 to generate a pulse train, it may be referred to as a control signal or a pulse control signal. It should be noted that pulse control signal $V_{TDC}$ asserts pulse generator 45 to generate a pulse train and de-asserts pulse generator 45, wherein de-asserting pulse generator 45 causes it to output a logic low voltage at its output. AND gate 44 generates a voltage $V_{30}$ at output 30 in response to a pulse train appearing at one of its inputs and a logic high voltage level appearing at its other input at time $t_2$. The pulse train at output 30 is identified by reference character 92 in FIG. 3 and serves as an input signal to transistor 82. In response to de-asserting pulse generator 45, voltage $V_{30}$ becomes a logic low voltage at time $t_3$.

At time $t_3$, rectified TRIAC signal $V_{RT}$ falls to a voltage level $V_{SOT}$ and the voltage at input node 42 becomes smaller than reference voltage $V_{REF2}$, i.e., the voltage at the non-inverting input of comparator 40 becomes smaller than the voltage at its inverting input, and a logic low voltage level appears at the output of comparator 40, which logic low voltage level makes the output voltage level of logic gate 44 a logic low voltage level. In response to pulse generator 45 generating a trigger pulse having a higher frequency than rectified TRIAC pulse $V_{RT}$, SR latch 46 generates an output signal at its Q output that turns on transistor 82 so that the output signal from full wave rectifier 52 is applied to transformer 60.

Transistor 82 turns off in response to the voltage at input node 26 being greater than reference voltage $V_{REF3}$. In addition, turning off transistor 82 causes switching circuits 20 and 22 and voltage divider network 34 to discharge the parasitic capacitance at input/output node 24 rather than the switching operation discharging this capacitance. In response to voltage $V_{RT}$ falling to the dummy load threshold voltage level $V_{DL}$ (shown in FIG. 3) at time $t_4$, comparator 32 generates a logic high voltage level at its output that turns on transistor 36, which generates a dummy load current $I_{DL}$.

Figure 4:
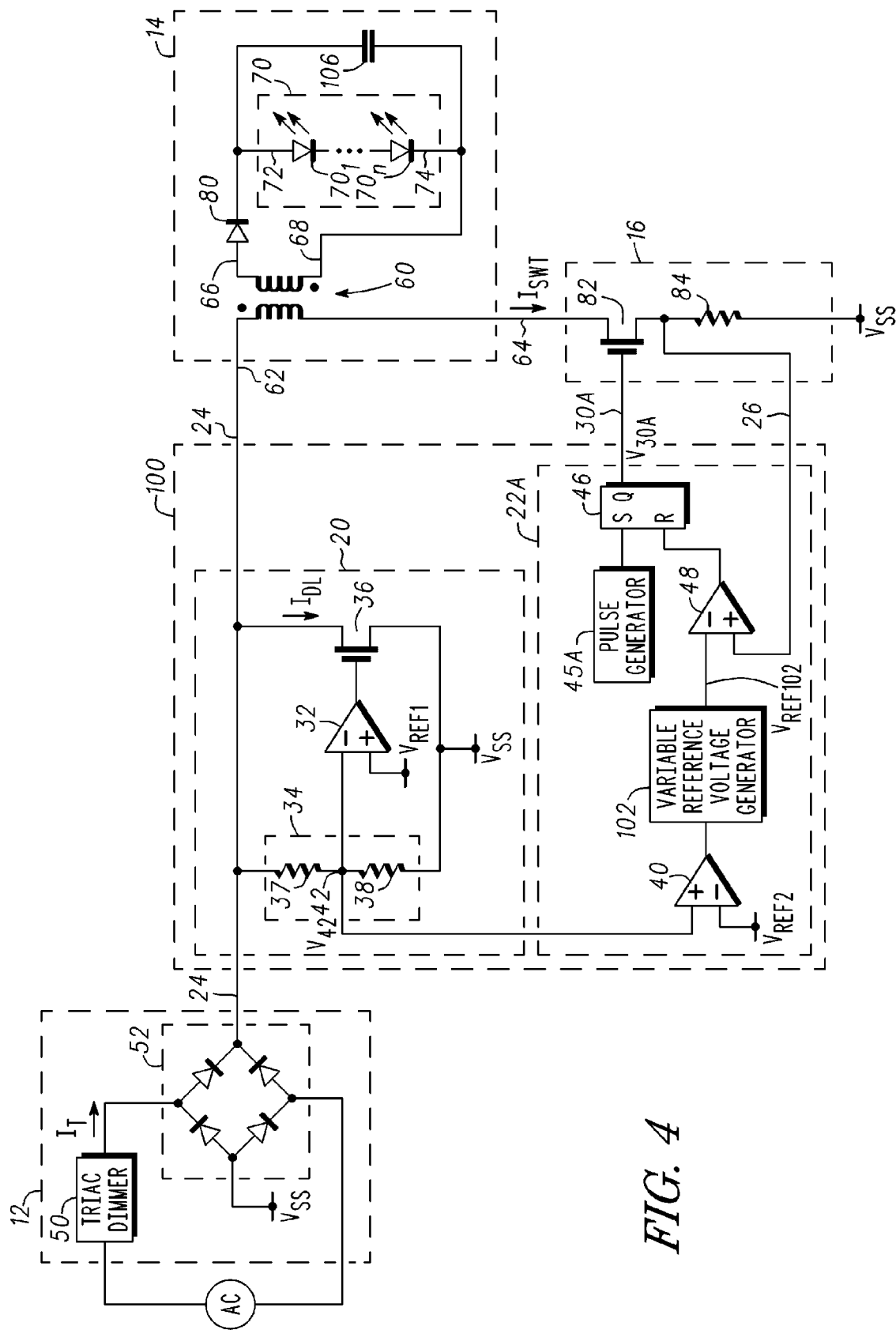
FIG. 4 is a circuit schematic of a control circuit suitable for controlling one or more light emitting diodes (LEDs) in accordance with another embodiment of the present invention.

FIG. 4 is a circuit schematic of a control circuit 100 suitable for controlling one or more light emitting diodes (LEDs) in accordance with another embodiment of the present invention. What is shown in FIG. 4 is a control circuit 100 coupled to an input circuit 12, a light generator 14, and a switching circuit 16. Control circuit 100 is comprised of switching circuits 20 and 22A and has an input/output node 24, an input 26, and an output 30A. Switching circuit 22A includes comparator 40, a pulse generator 45A, latch 46, comparator 48, and a variable reference voltage generator 102. Comparator 40 has a non-inverting input connected to node 42, an inverting input coupled for receiving a reference voltage $V_{REF2}$, and an output connected to an input of variable reference voltage generator 102. The output of pulse generator 45A is connected to, for example, a set input (S) of latch 46. The output of latch 46 is connected to output 30A. Comparator 48 has a non-inverting input that serves as input 26 of control circuit 100, an inverting input coupled for receiving a reference voltage $V_{REF102}$, and an output connected to the reset input (R) of latch 46. The output of variable reference voltage generator 102 is connected to the inverting input of comparator 48.

Figure 5:
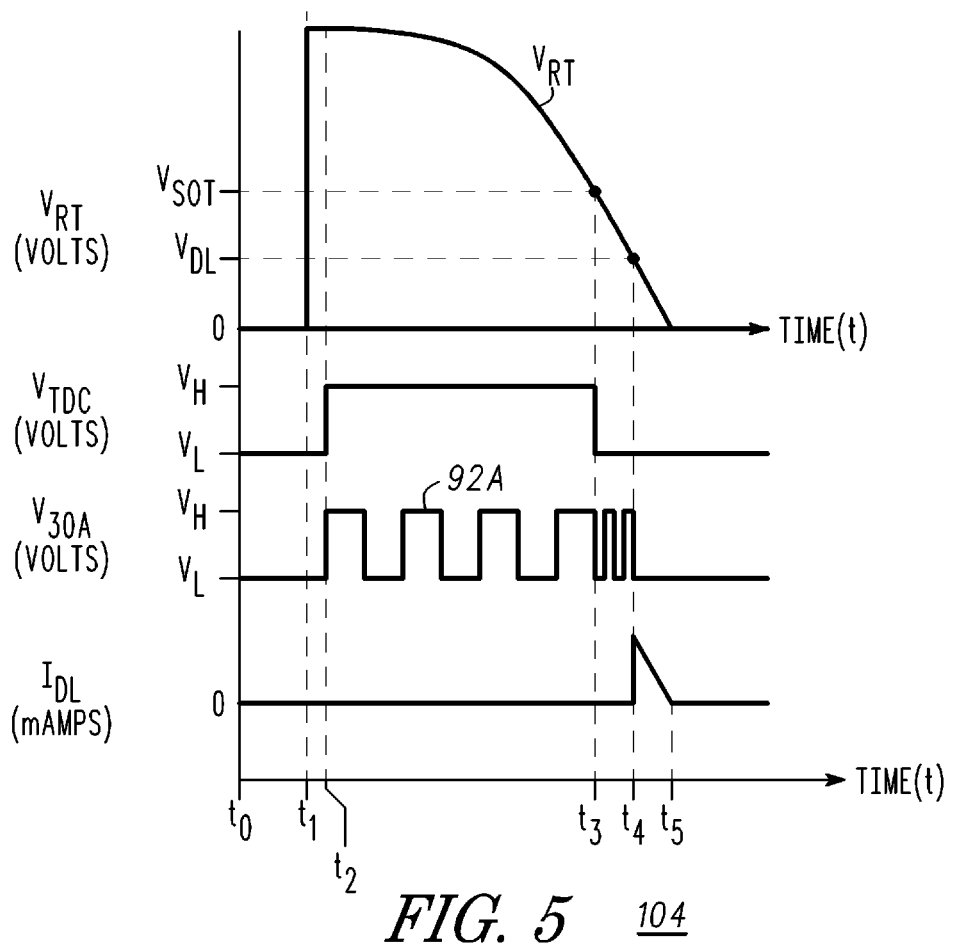
FIG. 5 is a timing diagram illustrating operation of the control circuit of FIG. 4 in accordance with embodiments of the present invention.

FIG. 5 is a timing diagram 104 illustrating the operation of control circuit 100 in accordance with embodiments of the present invention. Before time $t_0$, TRIAC dimmer 50 turns off or shuts off in response to a current $I_T$ flowing through its terminals being less than its holding current. In response to TRIAC dimmer 50 being off, the voltage at node 42 is less than reference voltage $V_{REF2}$, thus the voltage at the output of comparator 40 is at a logic low voltage level, resulting in latch 46 being in a non-latching configuration and the voltage at output 30A, i.e., the voltage at the gate of transistor 82, being at a logic low voltage level. Because the voltage at the gate of transistor 82 is at a logic low voltage level, transistor 82 is off and non-conducting and the dummy load current is at substantially zero milliamps (mamps). It should be noted that pulse generator 45A generates a pulse train but it is not latched by latch 46 because latch 46 is in a non-latching configuration.

At time $t_1$, TRIAC dimmer 50 turns on in response to receiving a trigger signal and generates a rectified TRIAC signal $V_{RT}$ (shown in FIG. 5) at input/output node 24, which results in a voltage $V_{42}$ being developed at node 42, i.e., voltage $V_{42}$ is developed at node 42 in response to applying rectified voltage signal $V_{RT}$ at input/output node 24. Voltage $V_{42}$ may be referred to as an adjusted rectified voltage because its voltage level is adjusted by voltage divider 34. Voltage $V_{42}$ serves as an input signal at the inverting input of comparator 32 and at the non-inverting input of comparator 40. In response to voltage $V_{42}$ exceeding reference voltage $V_{REF2}$ at time $t_2$, comparator 40 generates a voltage signal $V_{TDC}$ (shown in FIG. 5) having a logic high voltage level at node 42. Voltage $V_{TDC}$ being at a logic high voltage level causes variable reference voltage generator 102 to decrease its output voltage $V_{REF102}$ to a level that is less than the voltage level at input 26 resulting in comparator 48 generating a logic high voltage level at its output that causes latch 46 to latch the pulse signal from pulse generator 45A, which pulse train appears at output 30A as voltage signal $V_{30A}$. The pulse train at output 30A is identified by reference character 92A in FIG. 5 and serves as an input signal to transistor 82. In response to rectified voltage $V_{RT}$ reaching the switching operation threshold voltage $V_{SOT}$ at time $t_3$, reference voltage $V_{REF102}$ decreases, which decreases switching current $I_{SWT}$ resulting in a lower AC current. TRIAC dimmer 50 turns off in response to the current of switching transistor 82 falling below the holding current of TRIAC dimmer 50. It should be noted that from time $t_3$ to time $t_4$, voltage signal $V_{30A}$ at the gate of switching transistor 82 continues to switch but at such a low frequency that the level of current $I_{SWT}$ becomes too low for TRIAC dimmer 50 to remain on. Thus, TRIAC dimmer 50 turns off. In response to voltage $V_{RT}$ falling to the dummy load threshold voltage level $V_{DL}$ (shown in FIG. 5) at time $t_4$, comparator 32 generates a logic high voltage level at its output that turns on transistor 36, which generates a dummy load current $I_{DL}$.

Figure 6:
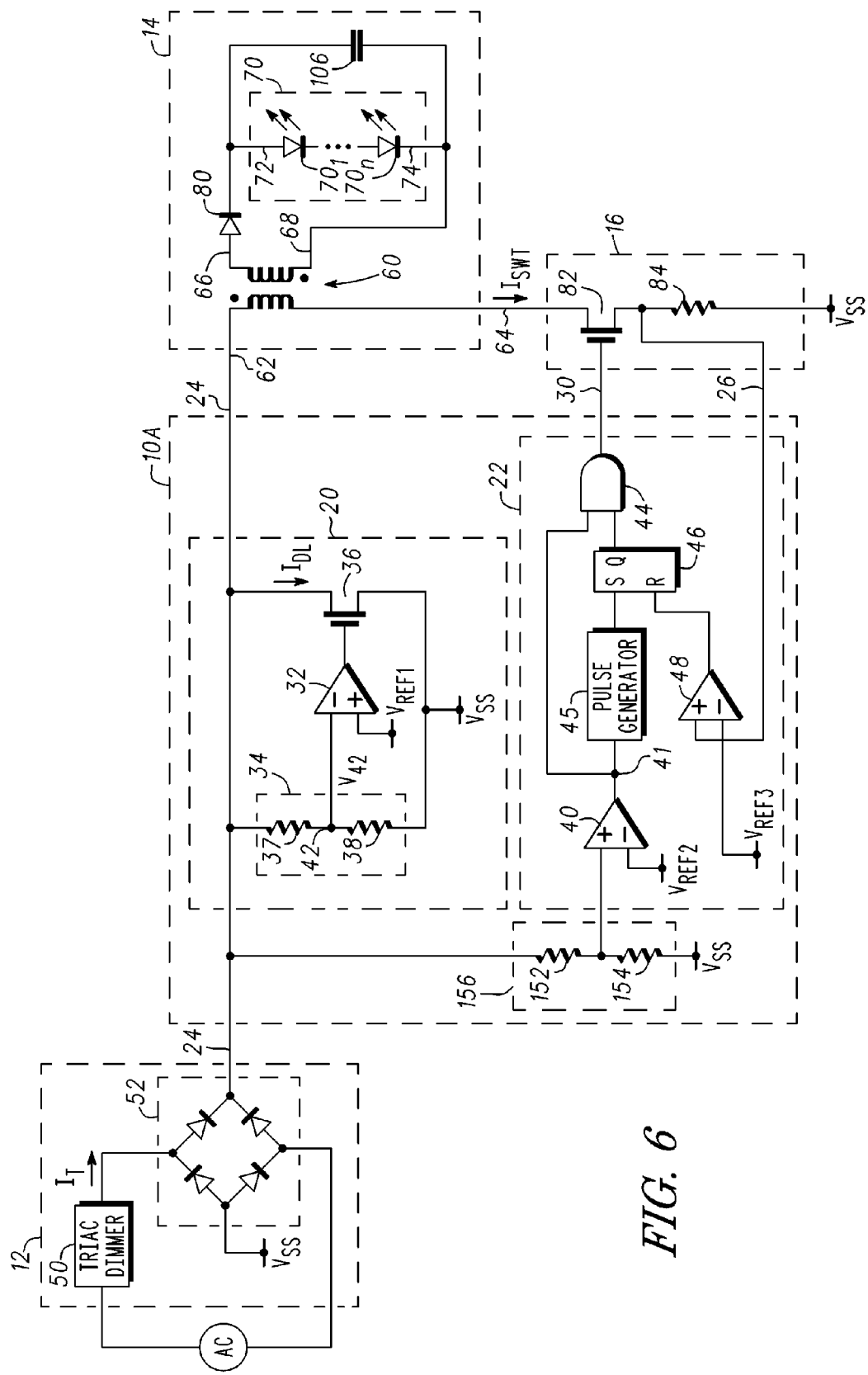
FIG. 6 is a circuit schematic of a control circuit suitable for controlling one or more light emitting diodes (LEDs) in accordance with another embodiment of the present invention.

FIG. 6 is a circuit schematic of a control circuit 10A suitable for controlling one or more LEDs in accordance with another embodiment of the present invention. What is shown in FIG. 6 is control circuit 10A coupled to an input circuit 12, a light generator 14, and a driver circuit 16. Control circuit 10A is similar to control circuit 10 of FIG. 1 except that a node 42 is not connected to the non-inverting input of comparator 40. Rather, input/output node 24 is connected to the non-inverting input of comparator 40 through a resistor 152. In addition, the non-inverting input of comparator 40 is connected to a source of operating potential such as, for example, $V_{SS}$ through a resistor 154. Resistors 152 and 154 are configured as a voltage divider network 156. Reference character "A" has been appended to reference character 10 in FIG. 6 to distinguish it from control circuit 10 of FIG. 1.

Figure 7:
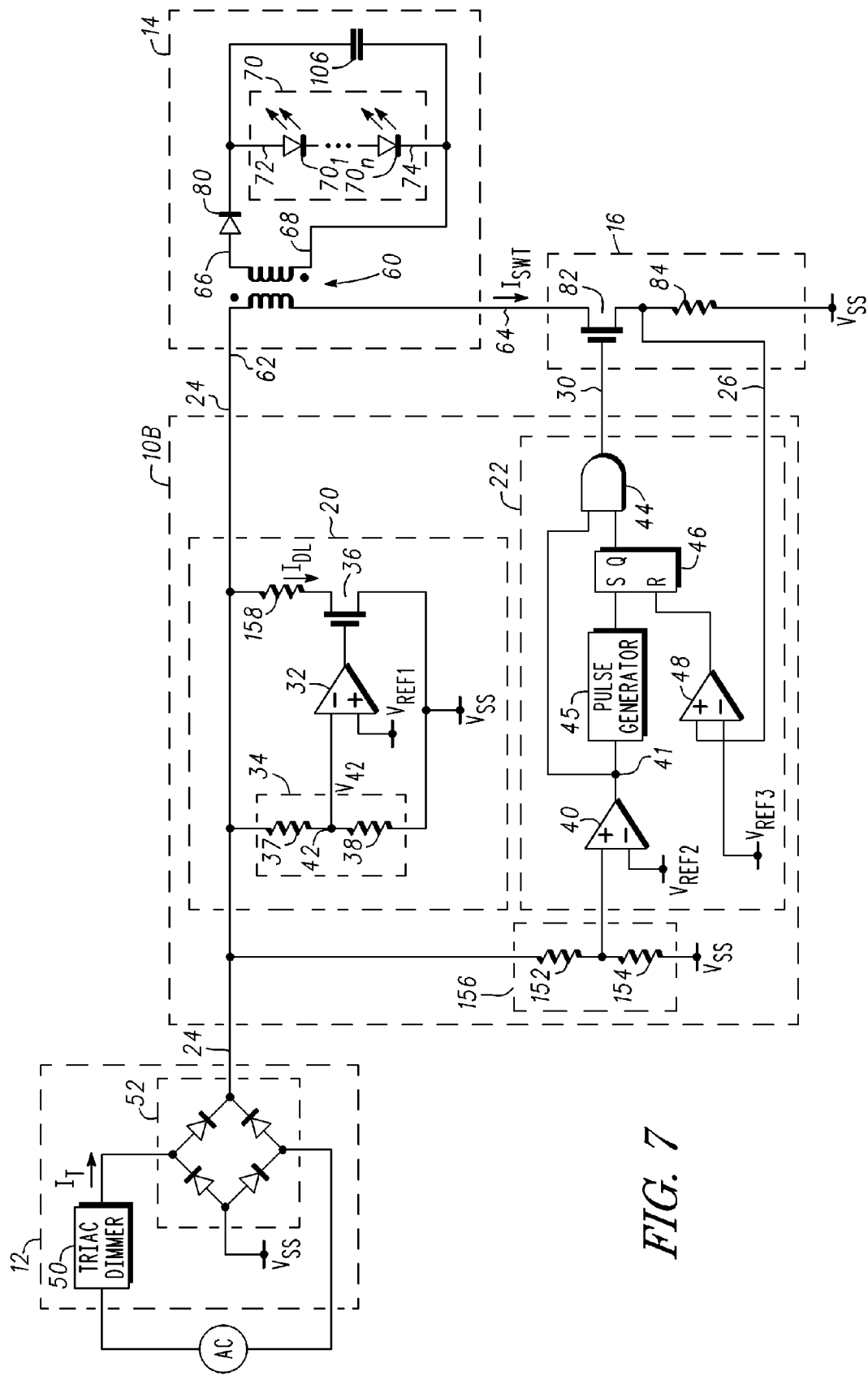
FIG. 7 is a circuit schematic of a control circuit suitable for controlling one or more light emitting diodes (LEDs) in accordance with another embodiment of the present invention.

FIG. 7 is a circuit schematic of a control circuit 10B suitable for controlling one or more LEDs in accordance with another embodiment of the present invention. What is shown in FIG. 7 is a control circuit 10B coupled to an input circuit 12, a light generator 14, and a driver circuit 16. Control circuit 10B is similar to control circuit 10A of FIG. 6 except that a current carrying electrode of transistor 36 is coupled to input/output node 24 through a resistor 158. Reference character "B" has been appended to reference character 10 in FIG. 7 to distinguish it from control circuit 10A of FIG. 6.

Figure 8:
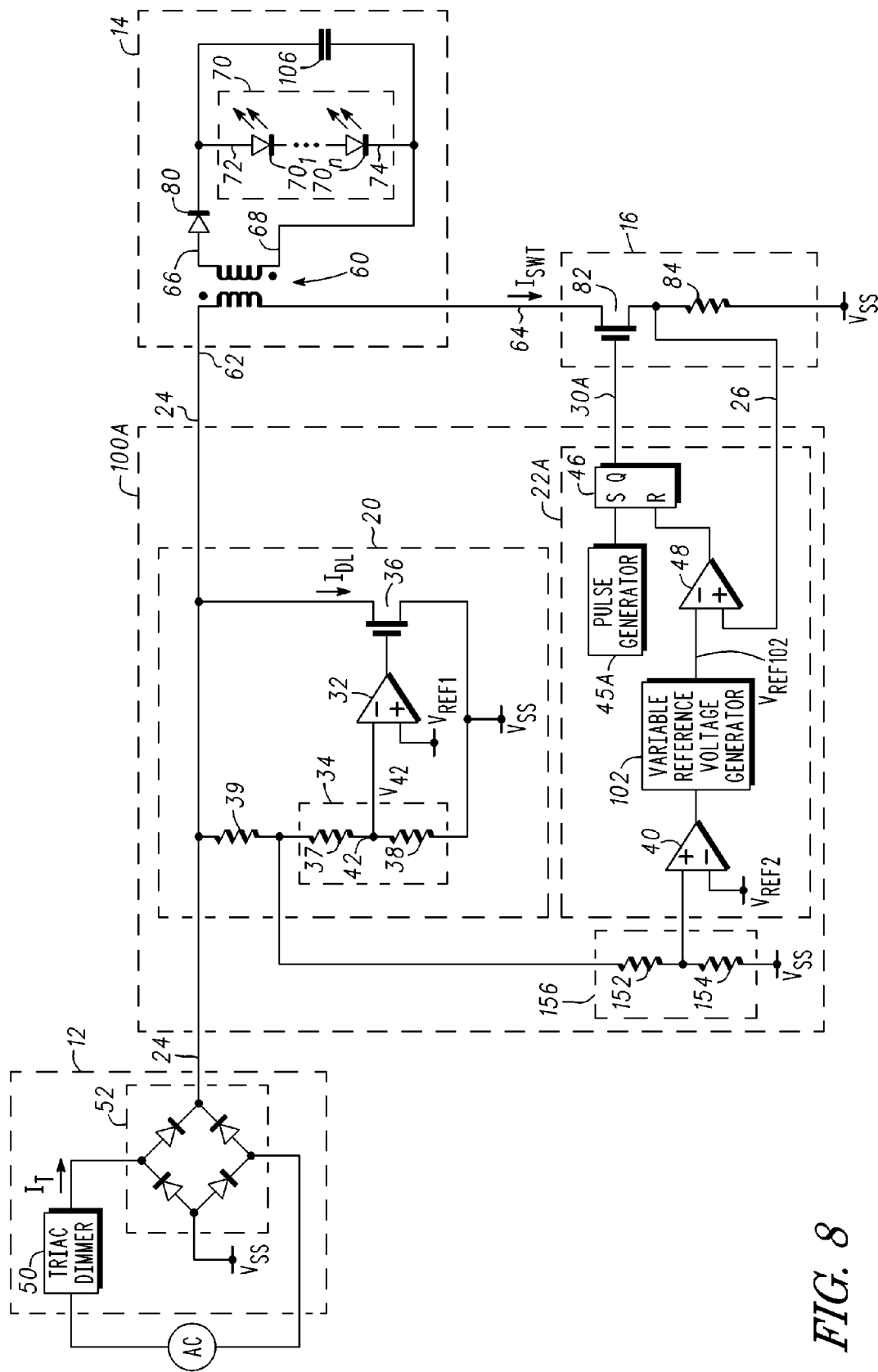
FIG. 8 is a circuit schematic of a control circuit suitable for controlling one or more light emitting diodes (LEDs) in accordance with another embodiment of the present invention.

FIG. 8 is a circuit schematic of a control circuit 100A suitable for controlling one or more LEDs in accordance with another embodiment of the present invention. What is shown in FIG. 8 is control circuit 100A coupled to an input circuit 12, a light generator 14, and a driver circuit 16. Control circuit 100A is similar to control circuit 100 of FIG. 4 except that node 42 is not connected to the non-inverting input of comparator 40. Rather, input/output node 24 is connected to the non-inverting input of comparator 40 through resistors 139 and 152. In addition, the non-inverting input of comparator 40 is connected to a source of operating potential such as, for example, $V_{SS}$ through resistor 154, wherein voltage $V_{SS}$ may be for example a ground potential. Resistors 152 and 154 are configured as a voltage divider network 156. Reference character "A" has been appended to reference character 100 in FIG. 6 to distinguish it from control circuit 100 of FIG. 4.

Figure 9:
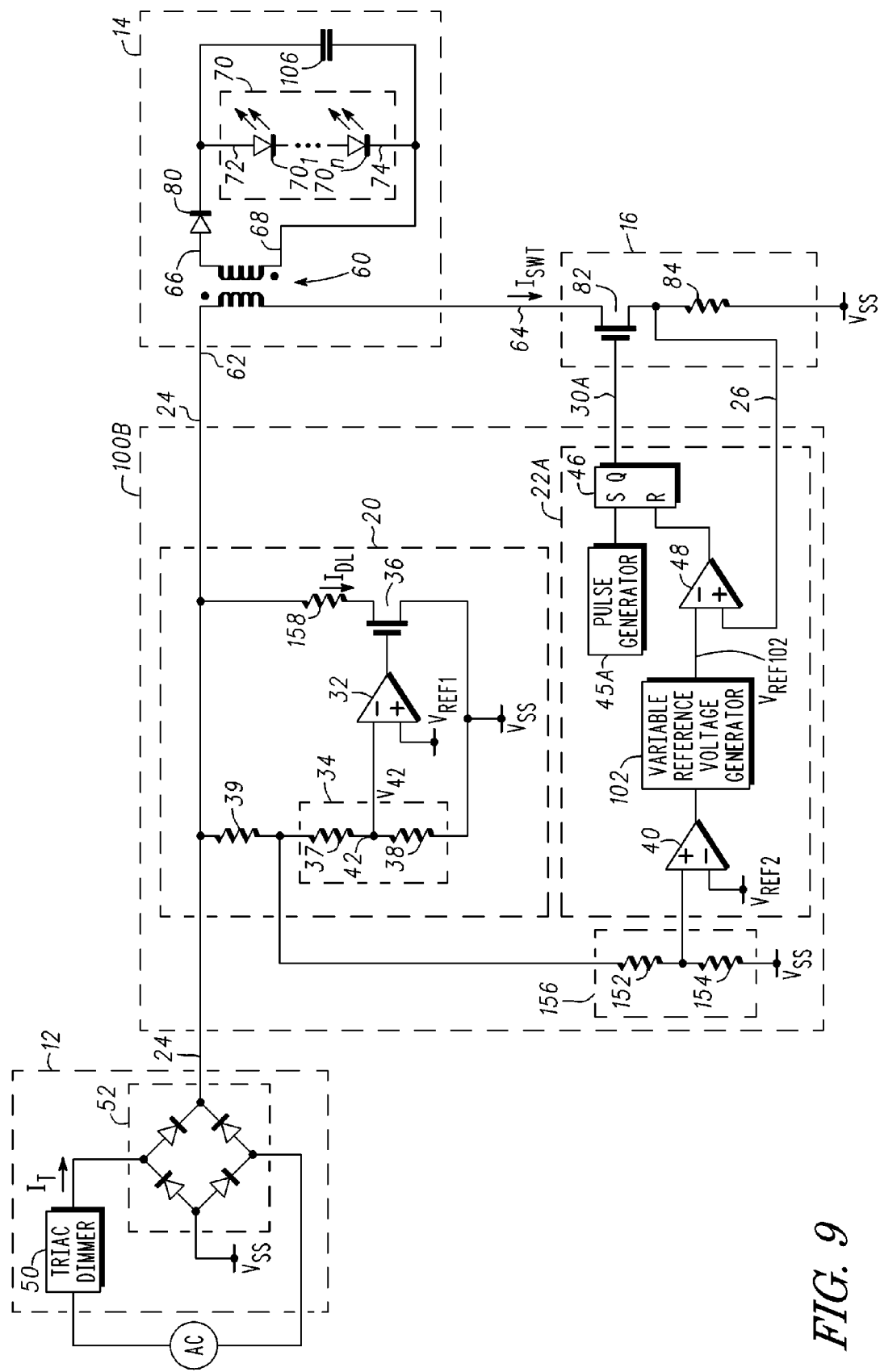
FIG. 9 is a circuit schematic of a control circuit suitable for controlling one or more light emitting diodes (LEDs) in accordance with another embodiment of the present invention.

FIG. 9 is a circuit schematic of a control circuit 100B suitable for controlling one or more light emitting diodes (LEDs) in accordance with another embodiment of the present invention. What is shown in FIG. 9 is a control circuit 100B coupled to an input circuit 12, a light generator 14, and a driver circuit 16. Control circuit 100B is similar to control circuit 100A of FIG. 8 except that a current carrying electrode of transistor 36 is coupled to input/output node 24 through a resistor 158. Reference character "B" has been appended to reference character 100 in FIG. 9 to distinguish it from control circuit 100A of FIG. 8.

By now it should be appreciated that a flicker control circuit and a method for reducing flicker have been provided. In accordance with embodiments of the present invention, stable operation of an LED circuit is realized by controlling the duty cycle of a TRIAC dimmer, wherein the TRIAC dimmer is turned off at a predetermined AC voltage. This technique allows lower consumption of electricity by confirming the on duty of a TRIAC dimmer, which lowers the electricity used by an LED. Embodiments mitigates flicker by, for example, reducing a TRIAC dimmer current while maintaining stable operation of the TRIAC dimmer.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for reducing flicker, comprising:
    generating an adjusted rectified voltage in response to a TRIAC signal from a TRIAC dimmer;
    generating a switching current in response to the adjusted rectified voltage being greater than a first reference voltage;
    decreasing the switching current in response to the adjusted rectified voltage becoming less than the first reference voltage;
    generating a first control signal in response to the adjusted rectified voltage becoming less than the first reference voltage;
    decreasing a second reference voltage in response to the first control signal; and
    turning off the TRIAC dimmer in response to decreasing the switching current.

2. The method of claim 1, wherein decreasing the switching current in response to the adjusted rectified voltage includes decreasing the switching current to zero.

3. The method of claim 1, wherein generating a switching current in response to the adjusted rectified voltage being greater than a first reference voltage comprises:
    asserting a pulse control signal in response to the adjusted rectified voltage being greater than the first reference voltage; and
    generating a switch control signal at a control terminal of a switching device in response to asserting the pulse control signal.

4. The method of claim 3, further including generating a pulse train in response to asserting the pulse control signal and generating the switch control signal at the control terminal of the switching device in response to the pulse train.

5. The method of claim 3, wherein decreasing the switching current in response to the adjusted rectified voltage becoming equal to the first reference voltage includes de-asserting the pulse control signal and turning off the switching device in response to de-asserting the pulse control signal.

6. The method of claim 1, further including generating a load current in response to the adjusted rectified voltage becoming less than a second reference voltage.

7. The method of claim 6, wherein the second reference voltage is less than the first reference voltage.

8. The method of claim 1, further including generating a load current after turning off the TRIAC dimmer.

9. A method for mitigating flicker, comprising:
    generating a rectified voltage in response to a TRIAC signal from a TRIAC;
    generating an adjusted rectified voltage from the rectified voltage;
    generating a switching signal in response to comparing the adjusted rectified voltage with a first predetermined voltage;
    decreasing the switching current in response to the adjusted rectified voltage becoming less than the first reference voltage;
    generating a first control signal in response to the adjusted rectified voltage becoming less than the first reference voltage;
    decreasing a second reference voltage in response to the first control signal; and
    turning off the TRIAC in response to the rectified voltage reaching a first predetermined voltage.

10. The method of claim 9, wherein generating the switching signal comprises generating one of a pulse train or a logic low voltage.

11. The method of claim 10, further including decreasing a TRIAC current in response to the switching signal being a logic low voltage.

12. The method of claim 11, wherein turning off the TRIAC in response to the decreasing the rectified voltage reaching a predetermined voltage includes turning off the TRIAC in response to decreasing the TRIAC current.

13. The method of claim 9, further including activating a switching circuit in response to the rectified voltage reaching a second predetermined voltage, the second predetermined voltage less than the first predetermined voltage.

* * * * *